United States Patent [19]

Nakayama et al.

[11] Patent Number: 5,608,022

[45] Date of Patent: Mar. 4, 1997

[54] PERFLUOROCARBON COPOLYMER CONTAINING FUNCTIONAL GROUPS AND A METHOD FOR PRODUCING IT

[75] Inventors: Yoshimichi Nakayama, Kawasaki; Masaaki Yonezawa, Nobeoka, both of Japan

[73] Assignee: Asahi Kasei Kogyo Kabushiki Kaisha, Osaka, Japan

[21] Appl. No.: 392,889

[22] PCT Filed: Oct. 7, 1994

[86] PCT No.: PCT/JP94/01682

§ 371 Date: Mar. 1, 1995

§ 102(e) Date: Mar. 1, 1995

[87] PCT Pub. No.: WO95/10541

PCT Pub. Date: Apr. 20, 1995

[30] Foreign Application Priority Data

Oct. 12, 1993 [JP] Japan ................................. 5-277381
Oct. 22, 1993 [JP] Japan ................................. 5-286268

[51] Int. Cl.⁶ ............................................................. C08F 12/30
[52] U.S. Cl. .......................... 526/212; 526/243; 526/245
[58] Field of Search .................................. 526/243, 255, 526/212, 245

[56] References Cited

U.S. PATENT DOCUMENTS 3,635,926   1/1972   Gresham et al. .
4,329,435   5/1982   Kimoto et al. .
5,281,680   1/1994   Grot ........................ 526/243

FOREIGN PATENT DOCUMENTS 0030115      6/1981   European Pat. Off. ............. 526/243
55-161810   12/1980   Japan .
55-160008   12/1980   Japan .
57-53371    11/1982   Japan .
60-250009   12/1985   Japan .
62-288617   12/1987   Japan .
63-48314     3/1988   Japan ............................... 526/243
63-297406   12/1988   Japan .
4-33904      2/1992   Japan .
6-184244     7/1994   Japan .
WO94/03503   2/1994   WIPO .

OTHER PUBLICATIONS

JP06184244; Jul. 1994 Tamura et al. p.4 abstract.
JP62288616; Dec. 1987 Miyake et al p. 14 abstract.
JP59089328; May 1984 Showa pp. 23–25 abstract.

*Primary Examiner*—Joseph L. Schofer
*Assistant Examiner*—N. Sarofin
*Attorney, Agent, or Firm*—Birch, Stewart, Kolasch & Birch, LLP

[57] ABSTRACT

The present invention provides a method for producing a perfluorocarbon copolymer containing functional groups, which comprises:

emulsifying a perfluorocarbon monomer containing a functional group represented by the following general formula (1) into fine dispersions having an average diameter of 2 μm or less in water:

$$CF_2=CF-O-(CF_2CF(CF_3)-O)n-(CF_2)m-Z \quad (1)$$

wherein m is an integer of 2 to 4; Z is $CO_2R$ (where R represents an alkyl group having 1 to 3 carbon atoms) or $SO_2F$; n is 1 or 2 when Z is $CO_2R$ and n is an integer of 0 to 2 when Z is $SO_2F$, adding at least one water-soluble organic chain transfer agent selected from the group consisting of aliphatic alcohols having 1 to 6 carbon atoms and ethers having 2 to 6 carbon atoms and polymerizing the perfluorocarbon monomer (1) containing a functional group with tetrafluoroethylene represented by the following formula (2):

$$CF_2=CF_2 \quad (2).$$

It also provides a perfluorocarbon copolymer containing functional groups obtained by this method.

According to the production method of the present invention, a perfluorocarbon copolymer containing functional groups, which has good melt moldability and excellent performance, can be produced while the formation of a homopolymer of tetrafluoroethylene in the aqueous phase is inhibited.

12 Claims, No Drawings

PERFLUOROCARBON COPOLYMER CONTAINING FUNCTIONAL GROUPS AND A METHOD FOR PRODUCING IT

TECHNICAL FIELD

The present invention relates to a perfluorocarbon copolymer containing functional groups and a method for producing it in an aqueous medium. Particularly, the present invention relates to a perfluorocarbon copolymer containing functional groups, which has excellent melt moldability and high performance, and a method for producing it in an aqueous medium.

BACKGROUND ART

A perfluorocarbon copolymer containing functional groups is often used as a base material for a cation exchange membrane for electrolysis of brine, a diaphragm for fuel cells, etc.

As the perfluorocarbon copolymer containing functional groups, a perfluorocarbon copolymer containing carboxylic functional groups and a perfluorocarbon copolymer containing sulfonic functional groups are particularly useful.

For example, in the diaphragm electrolysis of brine by using the cation exchange membrane, a high-purity sodium hydroxide can be produced at high current efficiency and low cell voltage by arranging a layer having carboxylic acid type cation exchange groups on the side of the membrane facing the cathode compartment and a layer having sulfonic acid type cation exchange groups on the side of the membrane facing an anode compartment. The carboxylic acid type cation exchange groups are prepared by converting functional groups of the perfluorocarbon copolymer containing carboxylic functional groups to cation exchange groups. The sulfonic acid type cation exchange groups are prepared by converting functional groups of the perfluorocarbon copolymer containing sulfonic functional groups to cation exchange groups.

With respect to the techniques for producing the perfluorocarbon copolymer containing carboxylic functional groups or sulfonic functional groups, studies have been made on techniques using an aqueous medium and techniques using a non-aqueous medium.

Techniques using a non-aqueous medium are described in, for example, Japanese Patent Application Laid-Open No. 92026/1982, U.S. Pat. No. 3,528,954, U.S. Pat. No. 3,642,742, U.S. Pat. No. 4,138,426 and U.S. Pat. No. 4,267,364. Since the methods described therein use chlorofluorocarbons such as 1,1,2-trichloro-1,2,2-trifluoroethane as a reaction medium, these methods cause an ecological problem in that the medium destroys the ozone layer.

Techniques for producing the perfluorocarbon copolymer containing carboxylic functional groups in an aqueous medium are described in, for example, Japanese Patent Publication No. 53371/1982, U.S. Pat. No. 4,138,373, Japanese Patent Application Laid-Open No. 161810/1980 and U.S. Pat. No. 4,320,205. But when the perfluorocarbon copolymer containing carboxylic functional groups obtained by these techniques is used as a base material for a cation exchange membrane for electrolysis of brine, sufficiently high current efficiency cannot be obtained as yet.

Techniques for producing a perfluorocarbon copolymer containing sulfonic functional groups in an aqueous medium are described in, for example, Japanese Patent Application Laid-Open No. 160008/1980, U.S. Pat. No. 3,635,926, Japanese Patent Application Laid-Open No. 288617/1987, WO86/07075, WO94/03503 and Japanese Patent Application Laid-Open No. 184244/1994. According to the methods described in Japanese Patent Application Laid-Open No. 160008/1980 and U.S. Pat. No. 3,635,926, it is extremely difficult to stably produce the perfluorocarbon copolymer containing sulfonic functional groups, which has a low equivalent weight. According to the methods described in Japanese Patent Application Laid-Open No. 288617/1987, WO86/07075 and WO94/03503, the perfluorocarbon copolymer containing sulfonic functional groups, which has a lower equivalent weight, can be produced. However, the perfluorocarbon copolymer containing sulfonic functional groups obtained by the methods described therein has extremely poor melt moldability. For example, when an extrusion film is produced from the above copolymer by conventional melt extrusion, the film is often cut at the side edge and often has spots on the surface due to the uneven thickness and the surface is often rough so that a uniform and good film cannot be obtained. Particularly, it is difficult to produce a thin film which is industrially useful and indispensable. According to the method described in Japanese Patent Application Laid-Open No. 184244/1994, it is difficult to obtain a copolymer having a high molecular weight, which has a practically sufficient strength.

In order to solve the above problems, the present invention provides a method for producing a copolymer of a perfluorocarbon monomer containing a functional group and tetrafluoroethylene, which has extremely improved performance, in an aqueous medium, and also a copolymer containing functional groups obtained by the method, which has high performance. The perfluorocarbon copolymer containing functional groups has extremely improved melt moldability. Further it can be used as excellent base materials for a cation exchange membrane, with which electrolysis of brine can be conducted at high current efficiency and a low power consumption.

DESCRIPTION OF THE INVENTION

The present inventors have made extensive and intensive studies about a copolymerization reaction of a perfluorocarbon monomer containing a functional group represented by the following general formula (1) and tetrafluoroethylene represented the following formula (2) in an aqueous medium and, as a result, have found that a homopolymer of tetrafluoroethylene formed in the aqueous phase deteriorates performance of the copolymer. The homopolymer is inevitably mixed into the copolymer when the copolymer is recovered from a reaction solution. The melt moldability of the copolymer containing the homopolymer is lowered extremely. In addition, the substantial ion exchange performance of a copolymer prepared by converting the functional groups of the copolymer into cation exchange groups is lowered.

The present inventors have found that, in order to prohibit the formation of the homopolymer, it is effective to emulsify the perfluorocarbon monomer (1) containing a functional group into fine dispersions having an average diameter of 2 μm or less in water, and polymerize it in the presence of a water-soluble organic chain transfer agent to provide active radicals, which can be chain transferred in an aqueous phase, and that performance of the perfluorocarbon copolymer containing functional groups thus obtained can be improved extremely. On the basis of these findings, the present inventors have completed the present invention.

That is, the present invention provides a method for producing a perfluorocarbon copolymer containing functional groups, which comprises:

emulsifying a perfluorocarbon monomer containing a functional group represented by the following general formula (1) (hereinafter often referred to as monomer (1)) into fine dispersions having an average diameter of 2 μm or less in water:

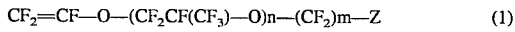
$$CF_2=CF-O-(CF_2CF(CF_3)-O)n-(CF_2)m-Z \qquad (1)$$

wherein m is an integer of 2 to 4; Z is $CO_2R$ (where R represents an alkyl group having 1 to 3 carbon atoms) or $SO_2F$; n is 1 or 2 when Z is $CO_2R$ and n is an integer of 0 to 2 when Z is $SO_2F$, adding at least one water-soluble organic chain transfer agent selected from the group consisting of aliphatic alcohols having 1 to 6 carbon atoms and ethers having 2 to 6 carbon atoms and polymerizing the perfluorocarbon monomer (1) containing a functional group with tetrafluoroethylene represented by the following formula (2).

$$CF_2=CF_2 \qquad (2)$$

The present invention also provides a method for producing a perfluorocarbon copolymer containing functional groups according to the above process, in which an equivalent weight of the produced copolymer is controlled by reducing the reaction pressure of tetrafluoroethylene in accordance with the increase of a conversion of the monomer (1).

Further, the present invention also provides a perfluorocarbon copolymer (A) containing functional groups (hereinafter often referred to as copolymer (A)), which comprises the following repeating units (a) and (b):

$$-[CF_2CF(-O-(CF_2CF(CF_3)-O)_n-(CF_2)_m-Z)]- \qquad (a)$$

wherein m is an integer of 2 to 4; Z is $CO_2R$ (where R represents an alkyl group having 1 to 3 carbon atoms) or $SO_2F$; n is 1 or 2 when Z is $CO_2R$ and n is an integer of 0 to 2 when Z is $SO_2F$ and $$-[CF_2CF_2]- \qquad (b),$$

comprises an amount "W" % by weight satisfying the following numerical formula (I) of a homopolymer (B) containing the repeating unit (b) (hereinafter often referred to as homopolymer (B)):
W=($H/16)×100≦0.4 [when EW is 650 to 1000]
W=($H/16)×100≦ (EW-930)/175 [when EW is 1000 to 1650] (I)
wherein $H is an endotherm [J/g (the perfluorocarbon copolymer containing functional groups)], which is calculated from an endothermic peak ascribed to melting of a crystal of the homopolymer comprising repeating unit (b) at 300° to 340° C. with a differential scanning calorimeter and EW is an equivalent weight of the perfluorocarbon copolymer containing functional groups [g(copolymer)/eq. (functional group)] and has an equivalent weight of 650 to 1650 [g (copolymer)/eq. (functional group)].

The monomer (1) to be used in the present invention is classified into two large groups, that is, a carboxylic acid type monomer (1) wherein Z is $CO_2R$ (wherein R is an alkyl group having 1 to 3 carbon atoms) in the above formula (1) and a sulfonic acid type monomer (1) wherein Z is $SO_2F$ in the above formula (1).

As the carboxylic acid type monomer (1) to be used in the present invention, the carboxylic acid type monomer (1)

wherein R is $CH_3$ in the above formula (1) is preferred. For example, the following compounds are used:

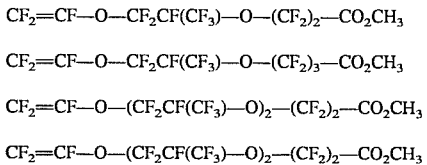
$$CF_2=CF-O-CF_2CF(CF_3)-O-(CF_2)_2-CO_2CH_3$$
$$CF_2=CF-O-CF_2CF(CF_3)-O-(CF_2)_3-CO_2CH_3$$
$$CF_2=CF-O-(CF_2CF(CF_3)-O)_2-(CF_2)_2-CO_2CH_3$$
$$CF_2=CF-O-(CF_2CF(CF_3)-O)_2-(CF_2)_2-CO_2CH_3$$

As the sulfonic acid type monomer (1) to be used in the present invention, for example, the following compounds are used:

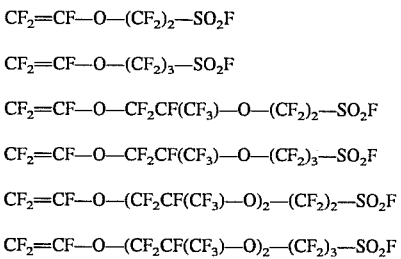
$$CF_2=CF-O-(CF_2)_2-SO_2F$$
$$CF_2=CF-O-(CF_2)_3-SO_2F$$
$$CF_2=CF-O-CF_2CF(CF_3)-O-(CF_2)_2-SO_2F$$
$$CF_2=CF-O-CF_2CF(CF_3)-O-(CF_2)_3-SO_2F$$
$$CF_2=CF-O-(CF_2CF(CF_3)-O)_2-(CF_2)_2-SO_2F$$
$$CF_2=CF-O-(CF_2CF(CF_3)-O)_2-(CF_2)_3-SO_2F$$

The carboxylic acid type monomer (1) and the sulfonic acid type monomer (1) can be used together.

In the present invention, one or more of perfluorovinyl ethers represented by the following general formula (3) or diolefins represented by the following general formula (4) can be used together with the monomers (1) and tetrafluoroethylene.

$$CF_2=CFOR_1 \qquad (3)$$

wherein $R_1$ is a perfluoroalkyl group having 1 to 10 carbon atoms.

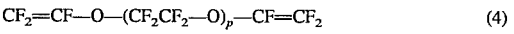
$$CF_2=CF-O-(CF_2CF_2-O)_p-CF=CF_2 \qquad (4)$$

wherein p is an integer of 2 to 10.

In the present invention, it is necessary to emulsify the monomer (1) into fine dispersions having an average diameter of 2 μm or less in water. If the monomer (1) is not emulsified into fine dispersions having an average diameter of 2 μm or less, tetrafluoroethylene is easily homopolymerized in the aqueous phase. The preferred average diameter of the monomers (1) is 1 μm or less.

In order to emulsify the monomers (1), known emulsification devices such as ultrasonic emulsifiers, homogenizers and colloid mill mixers can be used.

The water-soluble organic chain transfer agent to be used in the present invention is at least one selected from the group consisting of aliphatic alcohols having 1 to 6 carbon atoms and ethers having 2 to 6 carbon atoms. The agent has a solubility of 0.1% by weight or more in water. It can inhibit the formation of the homopolymer (B) in the aqueous phase and provide thermally stable molecular chain terminals.

Specific examples of the water-soluble organic chain transfer agents include alcohols such as methanol, ethanol, propanol, butanol, pentanol, hexanol, cyclohexanol, and ethers such as ethyl ether, propyl ether and tetrahydrofuran. Of these, an aliphatic alcohol having from 1 to 6 carbon atoms is preferred. An aliphatic alcohol having from 1 to 4 carbon atoms is more preferred. Methanol is most preferred.

The amount of the water-soluble organic chain transfer agent to be added is preferably 0.001 to 50 % by weight, more preferably 0.01 to 20 % by weight based on an amount of water. When the amount is too small, the formation of the homopolymer (B) cannot be sufficiently inhibited in the aqueous phase. When the amount is too large, copolymer (A) having a sufficient strength can not be obtained due to the decrease of the molecular weight of the copolymer (A) or the oil droplets of the monomer (1) easily are aggregated.

With respect to a method for adding the water-soluble organic chain transfer agent, known methods can be employed. The water-soluble organic chain transfer agent may be added before or after the emulsification of the monomer (1) into fine dispersions. When it is added after emulsifying the monomer (1) into fine dispersions and during the reaction, a method for adding it all at one time in the initial stage of the reaction or a method for dividing it into a plurality of portions and adding the portions by batchwise or a method for continuously adding it during the reaction may be used.

Two or more types of the water-soluble organic chain transfer agent may be used in combination.

In the present invention, the above water-soluble organic chain transfer agent may be used with a hydrophobic chain transfer agent such as alkanes, for example, pentane, hexane, heptane, octane, etc., or a gaseous chain transfer agent such as hydrogen, methane, ethane, in order to control the molecular weight of the copolymer (A). With respect to a method for adding these chain transfer agents, known methods can be used.

The water-soluble organic chain transfer agent to be used in the present invention can be also used as a molecular weight modififier for the copolymer (A) while maintaining a role of the chain transfer agent.

In the present invention, when a polymer having a low molecular weight is intentionally produced or when the monomer (1) is reacted to a high conversion, the particles of the copolymer (A) are often aggregated or precipitated. However, this may be prevented by using water-soluble organic chain transfer agents which are relatively hydrophobic, such as aliphatic alcohols having 2 to 6 carbon atoms. In particular, it is preferred to use methanol with the aliphatic alcohol having 2 to 6 carbon atoms in view of the operation of the reaction since it is unnecessary to continuously add the water-soluble organic chain transfer agent during the reaction. In this case, it is desirable that the amount of methanol to be added is the necessary minimum amount enough to inhibit the formation of the homopolymer (B) in the aqueous phase while the molecular weight of the copolymer (A) to be formed is controlled by suitably adjusting the amount of the aliphatic alcohol having 2 to 6 carbon atoms to be added together.

As the polymerization initiator to be used in the present invention, there may be used water-soluble polymerization initiators, for example, inorganic peroxides such as potassium persulfate, ammonium persulfate; redox type initiators such as ammonium persulfate-ferrous sulfate, ammonium persulfate-ammonium hydrogen sulfite; water-soluble organic peroxides such as disuccinic acid peroxide, etc.; as well as oil-soluble polymerization initiators, for example, azo compounds such as azobisisobutyronitrile; diacyl peroxides such as benzoyl peroxide, dipentafluoropropionyl peroxide; peroxy esters such as t-butyl peroxyisobutyrate; hydroperoxides such as diisopropylbenzene hydroperoxide, etc. Of these, water-soluble polymerization initiators are preferred because they can be uniformly dispersed in the reaction solution even when they are added after the emulsification of the monomer (1) into fine dispersions and the operation of the reaction using them is easy.

It is preferred that the polymerization initiator has high activity at the reaction temperature. The concentration of the polymerization initiator is about 0.0001 to 30% by weight, preferably about 0.001 to 10% by weight, based on the amount of the monomer (1). When the concentration is too high, the molecular weight of the copolymer (A) decreases so that the copolymer (A) having a sufficient strength can not be obtained.

As the dispersing agent to be used in the present invention, there may be used the dispersing agents conventionally used in polymerization of perfluoromonomers in an aqueous medium, such as surface-active agents, for example, potassium, sodium and ammonium perfluorosulfonates, or potassium, sodium and ammonium perfluorocarboxylates. Of these, perfluorocarboxylate type surfactants are preferred, which can easily be removed after polymerization. Particularly, $C_6F_{13}COONH_4$, $C_7F_{15}COONH_4$ and $C_8F_{17}COONH_4$ are more preferred.

The dispersing agent is used preferably at a concentration of about 0.001 to 10% by weight, more preferably about 0.05 to 2% by weight based on the amount of water. When the concentration of the dispersing agent is too low, the oil droplets of the fine dispersions of the monomer (1) often aggregate. When it is too high, the formation of the homopolymer (B) often increases in the aqueous phase. The dispersing agent may be added after the emulsification of the monomer (1) into fine dispersions. However, it is preferred that the dispersing agent is added before the emulsification of the monomer (1) into fine dispersions.

As the buffer agent to be used in the present invention, conventionally known ones such as sodium dihydrogenphosphate/disodium hydrogenphosphate may be used. The pH of the buffer agent is preferably a pH of 7 or less, more preferably a pH of 3 to 7, most preferably a pH of 4 to 7. When the pH of the buffer agent is more than 7, the monomer (1) is hydrolyzed. When the pH is too small, it is often difficult to control the copolymerization reaction because metal ions such as ferrous ions are dissolved out from the reaction tank to promote the decomposition of the polymerization initiator or the oil droplets of the monomer (1) often aggregate. The buffer agent is used at a concentration of preferably about 0.01 to 5% by weight, more preferably approximately 0.05 to 2% by weight, based on the amount of water. It is preferred that the buffer agent is added before the emulsification of the monomer (1) into fine dispersions because when it is not added before the emulsification, the pH of the liquid is lowered extremely during the process of the emulsification so that the oil droplets of the monomer (1) often aggregate.

In the present invention, in order to reduce the reaction pressure of tetrafluoroethylene, inactive fluorocarbon solvent such as 1,1,2-trichloro-1,2,2-trifluoroethane, perfluoromethylcyclohexane, perfluorodimethylcyclobutane, perfluorooctane, perfluorobenzene can be added. The inactive fluorocarbon solvent may be added after the emulsification of the monomer (1) into fine dispersions. However, it is preferably added before the emulsification in order to obtain a uniform concentration of the inactive fluorocarbon solvent in the oil droplets of the monomer (1).

In the present invention, the ratio by weight of the monomer (1) to water is preferably 0.05 to 2, more preferably 0.1 to 0.5. When the ratio is too large, the oil droplets of the monomer (1) easily aggregate. When the ratio is too small, the size of the reaction device and the equipment for separating and recovering the copolymer (A) is large, which causes disadvantages in the operation.

In the present invention, the concentration (in terms of the solid concentration) of the copolymer (A) in the latex is controlled to be preferably 40% by weight or less, more preferably 30% or less. When the concentration of the copolymer (A) is too high, the particles of the copolymer (A) aggregate and precipitate, which causes disadvantages in the operation.

The polymerization temperature is generally 0° to 200° C., preferably 20° to 90° C. The initial reaction pressure is 1 to 200 kg/cm$^2$, preferably 1 to 50 kg/cm$^2$.

The present invention requires two essential conditions for stably producing the above copolymer (A) having high performance, that is, emulsifying the monomer (1) into fine dispersions of 2 μm or less in water and adding at least one water-soluble organic chain transfer agent selected from the group consisting of aliphatic alcohols having 1 to 6 carbon atoms and ethers having 2 to 6 carbon atoms.

In addition, when the reaction pressure of tetrafluoroethylene is suitably reduced in accordance with the increase in the conversion of the monomer (1) so as not to change the equivalent weight of the copolymer (A), not only the increase in the equivalent weight of the copolymer (A) with the increase in the conversion of the monomer (1) may be inhibited but also the distribution of the equivalent weight of the copolymer (A) may be narrowed at every moment during the polymerization. Therefore, the uniformity of the equivalent weight of the copolymer can be maintained up to a high conversion of monomer (1) of 50 to 90%, and a perfluorocarbon copolymer containing functional groups, which has high performance, can be obtained.

Even though the reaction is conducted under a constant pressure of tetrafluoroethylene, it is sufficiently possible to prevent the copolymer (A) from having the uneven composition of the equivalent weight when the equivalent weight of the copolymer (A) is increased with the increase in the conversion of the monomer (1), as far as the polymerization conditions are suitably adjusted, for example, by using stirring blades having proper shapes in the polymerization tank and lowering the stirring intensity in accordance with the procedure of the reaction. Even so, however, it is impossible to narrow the distribution of the equivalent weight of the copolymer at every moment during the polymerization.

With respect to a method for controlling the reaction pressure of tetrafluoroethylene, known controlling methods may be used. For example, there may be used a cascade control method in which the amount of tetrafluoroethylene to be fed into the reaction tank (or the amount of tetrafluoroethylene to be dischaged from the reaction tank) and the reaction pressure of tetrafluoroethylene in the reaction tank are correlated to each other, etc. These two amounts to be controlled are influenced by various factors, such as the ratio by weight of the monomer (1) to water, the reaction temperature, the condition in the reaction tank filled with the monomer dispersions to be polymerized (i.e., the ratio of the gaseous phase of tetrafluoroethylene to the liquid phase of the monomer dispersions). Therefore, it is preferred that these factors are fixed and then the relation between the two amounts to be controlled and the equivalent weight of the obtained copolymer (A) is examined to determine the values of the two amounts to be controlled.

One concrete example of the method is described as follows.

First, the initial reaction pressure of tetrafluoroethylene necessary for obtaining the copolymer (A) having the intended equivalent weight is determined. This can be obtained from the relation between the reaction pressure and the equivalent weight of the copolymer (A) at a extremely low conversion of the monomer (1) of about 1 to 4%. Next, the amount of tetrafluoroethylene to be fed into the reaction tank from outside of the reaction system is arbitrarily determined. Next, some ranges of a gaseous pressure, which is reduced while the entire tetrafluoroethylene reacts, are arbitrarily determined. In each case, the reaction is carried out under cascade controlling so that the amount of tetrafluoroethylene to be fed may be proportional to the range of the pressure to be reduced. The suitable range of the pressure to be reduced, which is necessary to obtain the copolymer (A) having the same equivalent weight as that of the copolymer (A) obtained in the initial reaction stage, can be obtained by examining the change of the equivalent weight of the copolymer (A) according to the change of the range of the pressure to be reduced. The conversion of the monomer (1) reacted during this period is obtained from the weight and the equivalent weight of the obtained copolymer.

Subsequently, based on the point at which the previous reaction has finished as the new standard point, the conversion of the monomer (1) is further increased to obtain the suitable range of the pressure to be reduced in the same manner as above. Afterwards, this operation is repeated in order. Thus, the relation between the amount of tetrafluoroethylene to be fed into the reaction tank and the pressure of tetrafluoroethylene, as well as the relation between the conversion of the monomer (1) and the pressure of tetrafluoroethylene can be obtained.

In order to reduce the change of the equivalent weight of the copolymer (A) with the progress of the copolymerization reaction, it is desired that, in the above method, the amount of tetrafluoroethylene to be fed into the reaction tank is determined at a small value and tested to obtain the more detailed relation between the amount of tetrafluoroethylene to be fed into the reaction tank and the pressure of tetrafluoroethylene in the same tank.

The copolymer (A) to be produced according to the present invention comprises the following repeating units (a) and (b):

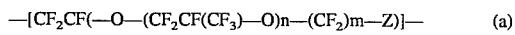

$$-[CF_2CF(-O-(CF_2CF(CF_3)-O)n-(CF_2)m-Z)]- \qquad (a)$$

wherein m is an integer of 2 to 4; Z is $CO_2R$ (where R represents an alkyl group having 1 to 3 carbon atoms) or $SO_2F$; n is 1 or 2 when Z is $CO_2R$ and n is an integer of 0 to 2 when Z is $SO_2F$ and

$$-[CF_2CF_2]- \qquad (b),$$

comprises an amount "W" % by weight satisfying the following numerical formula (I) of a homopolymer (B) containing the repeating unit (b):

W=($H/16)×100≦0.4 [when EW is 650 to 1000]

W=($H/16)×100≦ (EW-930)/175 [when EW is 1000 to 1650] (I)

wherein $H is an endotherm [J/g (the perfluorocarbon copolymer containing functional groups)], which is calculated from an endothermic peak ascribed to the melting of a crystal of the homopolymer comprising repeating unit (b) at 300° to 340° C. with a differential scanning calorimeter and EW is an equivalent weight of the perfluorocarbon copolymer containing functional groups [g (copolymer)/eq. (functional group)] and has an equivalent weight of 650 to 1650 [g (copolymer)/eq. (functional group)].

The copolymer (A) generally has a molecular weight of 8,000 to 1,000,000. The melt index of the copolymer (A), which is measured by using a device having an orifice with an inner diameter of 2.09 mm and a length of 8 mm at a temperature of 250° C. to 290° C., is generally 0.01 g/10 min to 500 g/10 min.

The meaning of the homopolymer in the homopolymer (B) also includes a copolymer comprising about 1 mole % or less of the above repeating unit (a). In this case, the copolymer has an equivalent weight of 10,000 or more so that the amount of the functional groups of the copolymer can not substantially be measured. The functional groups of the copolymer cannot be converted into ion exchange groups, or if the functional groups are converted into the ion exchange groups, most of the converted groups do not perform as ion exchange groups.

The copolymer (A) of the present invention has extremely excellent melt moldability because it comprises the amount satisfying the above numerical formula (I) of the homopolymer (B). The shrinking of the copolymer (A), which causes the deterioration of its melt moldability, hardly occurs during the cooling step in the melt molding. A swell of the copolymer (A), which is the index for the shrinkage of the copolymer (A) during the cooling step in the melt molding and which will be mentioned hereinafter, is 40% or less.

After the latex obtained by the method of the present invention is coagulated and disrupted to precipitate the copolymer (A), the copolymer (A) can be obtained generally in powder form by washing and drying the copolymer (A). With respect to post treatment of the latex, conventional techniques can be used.

With respect to a method for coagulating and disrupting the latex, known techniques such as freeze-drying disruption, shearing disruption, salting out, acid disruption, etc. can be used.

Washing of the copolymer (A) is conducted in order to fully remove impurities such as an inorganic salt and a dispersing agent, from the copolymer. As the washing solvent, there can be used water, mixed solvents of water/organic solvent, and organic solvents. In view of the simple operation and the easiness in removing the impurities, washing solvents such as water, a mixed solvent of water/methanol, and methanol can be used.

Drying of the copolymer (A) is conducted in order to remove the washing solvent and the remaining monomer (1). For example, a vacuum drying method at a temperature of about 50° C. to 150° C. can be used.

After polymerization, the copolymer (A) of the present invention is shaped into films or pellets, if desired. To shape it, the general technique of melting a copolymer followed by shaping it into thin films or pellets can be used.

The copolymer (A) of the present invention can be shaped into an industrially useful and indispensable thin film by known conventional melt-extrusion filming methods. The film is not cut at the side edge and has no spots on the surface due to the uneven thickness and the rough surface. Even an extremely thin film having a thickness of 0.5 mil to 1 mil or less can be continuously and stably produced from the copolymer (A).

The cation exchange membrane obtained from copolymer (A) of the present invention can be used, for example, as a diaphragm in diffusion dialysis or electrolysis of aqueous solutions of alkali metal halides. Particularly, when the cation exchange membrane obtained by converting the functional groups of the carboxylic acid type copolymer (A) into cation exchange groups is used as the diaphragm in cation exchange membrane electrolysis of brine, an extremely high current efficiency of 96% to 98% can be obtained. Such a high current efficiency can not be obtained as yet when a perfluorocarbon copolymer containing carboxylic functional groups obtained by conventional methods in an aqueous medium is used.

The cation exchange membrane may be made of only carboxylic acid type copolymer (A) of the present invention, or it may have layers of the sulfonic acid type copolymer (A) and the carboxylic acid type copolymer (A) of the present invention and/or may have a structure having webs of other fluorocarbon polymers, as the reinforcing material to reinforce the mechanical strength, in the membrane. The cation exchange membrane is used as the diaphragm to partition an electrolytic cell into an anode compartment and a cathode compartment. The diaphragm has a layer facing the cathode compartment and having the carboxylic acid type cation exchange groups formed by converting the functional groups of carboxylic acid type copolymer (A) of the present invention into cation exchange groups. An aqueous sodium hydroxide solution having a high concentration of 20 to 35% by weight or higher can be produced stably in the cathode compartment at high current efficiency and a low electric power consumption for a long period by feeding a brine solution having a concentration of 1 to 5N into the anode compartment under conventional electrolysis conditions of a current density of 5 to 70 A/dm$^2$ and a temperature of 20° to 100° C.

The sulfonic acid type copolymer (A) of the present invention can also be used as a base material for diaphragms for fuel cells, in addition to using it as a base material for diaphragms for electrolysis of aqueous solutions of alkali metal halides mentioned above. In this case, the sulfonic acid type functional groups of the copolymer are converted into acid type ($SO_3H$-type) groups.

In all of these uses, the copolymer (A) having a low equivalent weight is desired to attain low resistance. The sulfonic acid type copolymer (A) of the present invention can have a melt index, which indicates the molecular weight, of 60 g/10 min or less at 270° C. even though it has an extremely low equivalent weight of 800 to 900. The sulfonic acid type copolymer (A) having the above melt index value has a sufficiently high molecular weight for practical use.

BEST MODE FOR CARRYING OUT THE INVENTION

EXAMPLES

Hereinafter, the present invention will be described in more detail with reference to the following examples, which should not be construed as limiting the scope of the present invention.

In all the following examples and comparative examples, the treatment of the latex after the copolymerization reaction was conducted as follows.

After the reaction, the latex was dropwise added to an aqueous solution of 0.5N hydrochloric acid, 0.5N sulfuric acid, a mixture of 0.5N hydrochloric acid, methanol and water or a mixture of 0.5N sulfuric acid, methanol and water with stirring at a temperature of room temperature to 40° C. to completely precipitate a copolymer, and a copolymer containing liquid was separated by centrifugal filtration. Next, using a solution of a mixture of water/methanol=50/50 (by volume), the copolymer was washed and filtered by centrifugation repeatedly three times or more to fully remove the remaining inorganic salts and the dispersing agent. The obtained copolymer containing liquid was dried in vacuum at 90° C. to 110° C. to obtain a powdery or blockish copolymer.

The average diameter of the oil droplets of the fine dispersions of the monomer (1), the equivalent weight, the melt index and the swell of the copolymer (A), the conversion of the monomer (1) and the amount of the endotherm $H at the endotherm peak in the following examples and comparative examples, as well as the current efficiency in the following use examples were obtained as follows.

(Average diameter of oil droplets of the monomer (1))

The average diameter of oil droplets of fine dispersions of the monomer (1) was obtained by using an automatic, ultra-centrifugal particle size distribution measuring device, Model CAPA-700 manufactured by Horiba Seisaku-sho K. K.

(Equivalent weight of the copolymer (A))

The equivalent weight of the copolymer (A) was measured as follows. All the carboxylic functional groups of the carboxylic acid type copolymer (A) were converted into methyl ester type groups before the measurement.

A film having a thickness of about 200 μm was obtained by press molding the copolymer (A), and its weight was accurately weighed. The weight was referred to as $w_1$ [g]. Next, all the functional groups of the copolymer (A) were converted into cesium salt type groups by treating the film with a mixed solution of 3 N-cesium hydroxide aqueous solution/50 vol. % methanol at 60° C. for 16 hours or more. Subsequently, the film was taken out and washed with running water at room temperature for 30 minutes or more and then with ion exchanged water at 90° C. for 12 hours or more (while the washing liquid was renewed 5 times or more) to completely remove the donnan salts in the film. The film was taken out and dried in vacuum at 150° C. for 16 hours or more and then completely dried in a desiccator containing phosphorus pentoxide at room temperature for 3 days or more until no weight loss was detected. The weight of this film was accurately weighed. The weight was referred to as $w_2$ [g]. The equivalent weights [g (copolymer)/eq. (functional group)] of the carboxylic acid type copolymer (A) and the sulfonic acid type copolymer (A) were calculated from $w_1$ [g] and $w_2$ [g] on the basis of the following numerical equations (II) and (III) respectively:

$$EW=(117.870)(w_1)/(w_2-w_1) \qquad (II)$$

$$EW=(129.906)(w_1)/(w_2-w_1) \qquad (III)$$

(Melt index of the copolymer (A))

The melt index of the copolymer (A) having $CO_2CH_3$ type functional groups or $SO_2F$ type functional groups was measured by using an melt indexer, S-10 Model manufactured by Toyo Seiki Seisaku-sho Co. This was represented by the weight of the copolymer [g/10 min] which came out through the orifice having an inner diameter of 2.09 mm and a length of 8 mm at a temperature of 250° to 290° C. and under a load of 2.16 kg for 10 minutes. The melt index of the copolymer (A) indicates the molecular weight of the copolymer (A). The larger the molecular weight, the smaller the melt index. Unless otherwise specifically indicated in the following examples, the melt index was measured at 270° C.

(Swell of the copolymer (A))

The swell of the copolymer (A) was measured by the following method. The swell indicates the degree of shrinkage of the copolymer (A) during the cooling step in the melt-molding of the copolymer. The smaller the value of the swell, the smaller the degree of shrinkage of the copolymer. The copolymer having a smaller degree of shrinkage has better melt moldability. The swell indicates the melt moldability of the copolymer. The swell was obtained by measuring the diameter "D" [mm] of the yarn of the copolymer (A) extruded out through the same orifice as that used in measuring its melt index in the above and then comparing the diameter of the yarn with the inner diameter of the orifice. The swell [%] is represented by the following numerical equation (IV):

$$\text{Swell } (\%)=((D/2.09)-1) \times 100 \qquad (IV)$$

(Conversion of the monomer (1))

The conversion "x" (%) of the monomer (1) is calculated by the following numerical equation (V):

$$x\ (\%)=(w_4 \times w/(EW))/W_3 \times 100 \qquad (V)$$

wherein w [g/mol] is the molecular weight of monomer (1); $w_3$ [g] is the weight of the monomer (1) fed into the reactor; $w_4$ [g] is the weight of the obtained copolymer (A); EW is the equivalent weight of the obtained copolymer (A) [g (copolymer)/eq. (functional group)].

(An endotherm "$H" at an endotherm peak)

The endotherm "$H" at the endotherm peak [J/g (the perfluorocarbon copolymer containing functional groups)] of the copolymer having $CO_2CH_3$ type or $SO_2F$ type functional groups was measured by using a differential scanning calorimeter (DSC), DSC-100 Model manufactured by Seiko Electronic Industry Co. as follows. A sealable sample container made of Al having a capacity of 15 μl was used. About 20 mg of the sample (its weight was accurately measured) was put into the sample room and about 15 mg of Al was put into the reference room. After sealed, the container was heated from room temperature up to 380° C. at a rate of temperature rise of 5° C./min, and the endotherm was calculated from the endothermpeak (crystal-melting peak) at 300° C. to 340° C. in the obtained DSC curve.

(Current efficiency in Use Examples)

The current efficiency was measured as follows.

A small chloralkali cell (active area: 1 $dm^2$, anode: $RuO_2$/expanded Ti metal, cathode: active nickel/expanded Fe metal, spacing between anode and cathode: 2mm) was separated into a cathode compartment and an anode compartment by using membrane mentioned in each use example. The membrane has the layer facing the cathode compartment and having carboxylic acid type cation exchange groups formed by converting the functional groups of the carboxylic acid type copolymer (A) into cation exchange groups. 200 g/liter of brine was fed into the anode compartment while water was fed into the cathode compartment so that the aqueous solution of sodium hydroxide to be produced therein may have the pre-determined concentration, and the electrolysis of brine was continuously conducted at a current density of 40 $A/dm^2$ and at 90° C. The "current efficiency (%)" was calculated by measuring the amount of the aqueous solution of sodium hydroxide produced in the cathode compartment by the electrolysis.

(Examples of the carboxylic acid type copolymer (A))

The following Examples 1 to 14 and Comparative Examples 1 to 6 demonstrate the production of the copolymer (A) of $CF_2=CFOCF_2CF(CF_3)O(CF_2)_2CO_2CH_3$ and tetrafluoroethylene. The results are shown in Tables 1 to 3.

In Example 2 and Comparative Examples 4 to 6, a hydrophobic chain transfer agent, n-hexane, was used as the molecular weight modifier for copolymer (A). In Examples 3 to 14, the water-soluble organic chain transfer agent was used as the molecular weight modifier for copolymer (A) while maintaining a role of the chain transfer agent.

In Example 8 and Example 14, the reaction temperature was 40° C. It was 50° C. in all the other examples and comparative examples. In Example 7 and Example 11, a 100-liter autoclave was used. A one-liter autoclave was used in all the other examples and comparative examples.

Example 1

1.25 g of $C_7F_{15}COONH_4$, 2.5 g of $Na_2HPO_4.12H_2O$ and 1.5 g of $NaH_2PO_4.2H_2O$ were dissolved in 450 g of ion-exchanged water, and 100 g of $CF_2=CFOCF_2CF(CF_3)O(CF_2)_2CO_2CH_3$ were added. Next, the monomer was emulsified into fine dispersions by using a biomixer (trade mark), ABM-4 Model manufactured by Nippon Seiki K. K. at 20,000 rpm for 15 minutes while cooling them so that the liquid temperature might be 20° C. or lower. The average diameter of the monomer droplets of the fine dispersions was 0.55 μm. The dispersion was put into a stainless steel autoclave having a capacity of one liter, which was then fully purged with nitrogen and then with tetrafluoroethylene. The temperature was elevated up to 50° C. The tetrafluoroethylene pressure was adjusted at 15.5 kg/cm².

Next, a solution prepared by dissolving 1.0 g of methanol in 50 g of ion-exchanged water was added to the autoclave, and a solution prepared by dissolving 1.6 g of $(NH_4)_2S_2O_8$ in 10 g of ion-exchanged water was added to it. The polymerization was conducted for one hour while tetrafluoroethylene was fed so that the tetrafluoroethylene pressure might be kept constant. After the reaction, 23.2 g of a copolymer was obtained. The obtained copolymer had a melt index of 0.5 g/10 min at 270° C., a swell of 8% and an equivalent weight of 1090 g/eq. The copolymer was melt-kneaded at 270° C., and its swell was 22% at 270° C. DSC of the copolymer was measured, and the heat of fusion "$H" of the crystals of the homopolymer was calculated. However, the peak was extremely small in such a degree that it could not be separated from the noise in the DSC curve, and it was lower than the detection limit ($H<0.05 [J/g]). The conversion of the perfluorocarbon monomer containing the functional group in the reaction was 9%.

Comparative Example 1

The same polymerization process as in Example 1 was repeated except that the monomer was not emulsified into fine dispersions and no methanol was used. The melt index of the obtained copolymer was smaller than 0.01 g/10 min. at 270° C. so that it could not be measured. The film obtained from the copolymer was noticeably devitrified (to be cloudy).

In this case where the monomer was not emulsified into fine dispersions, the monomer was rapidly aggregated and precipitated when the stirring of the dispersion was stopped. Therefore, in this case, the measurement of the average diameter of the monomer droplets could not be conducted. The average diameter of the monomer droplets was presumed to be at least about 5 μm while the dispersion was stirred (during the polymerization reaction). The same applied to the following comparative examples where the monomer was not emulsified into fine dispersions.

Comparative Example 2

The same polymerization reaction as in Example 1 was repeated except that the monomer was not emulsified into fine dispersions. The melt index of the obtained copolymer was smaller than 0.01 g/10 min. at 270° C. so that it could not be measured. The film obtained from the copolymer was noticeably devitrified (to be cloudy).

Comparative Example 3

The same polymerization reaction as in Example 1 was repeated except that no methanol was used. The film of the obtained copolymer was noticeably devitrified (to be cloudy). The copolymer was melt-kneaded at 290° C., and its swell was 185% at 270° C. The swell of the copolymer was extremely increased because of melt-kneading.

Example 2

1.13 g of $C_8F_{17}COONH_4$, 2.3 g of $Na_2HPO_4.12H_2O$ and 1.4 g of $NaH_2PO_4.2H_2O$ were dissolved in 450 g of ion-exchanged water, and a solution prepared by dissolving 0.1 g of n-hexane in 150 g of $CF_2=CFOCF_2CF(CF_3)O(CF_2)_2CO_2CH_3$ was added. Next, the monomer was emulsified into fine dispersions by using a biomixer (trade mark), ABM-4 Model produced by Nippon Seiki K.K. at 20,000 rpm for 15 minutes while cooling them so that the liquid temperature might be 20° C. or lower. The dispersion was put into a stainless steel autoclave having a capacity of one liter, which was then fully purged with nitrogen and then with tetrafluoroethylene. The monomer dispersion was heated up to 50° C. The tetrafluoroethylene pressure was adjusted at 17.0 kg/cm². Next, a solution prepared by dissolving 1.0 g of methanol in 5 g of ion-exchanged water was added the autoclave, and a solution prepared by dissolving 2.7 g of $(NH_4)_2S_2O_8$ in 10 g of ion-exchanged water was added it. The polymerization was conducted for one hour while tetrafluoroethylene was fed so that the tetrafluoroethylene pressure might be kept constant.

Comparative Example 4

The same polymerization reaction as in Example 2 was repeated except that no methanol was added. The film of the obtained copolymer was noticeably devitrified (to be cloudy). The copolymer was melt-kneaded at 270° C., and its swell was 235% at 270° C. The swell of the copolymer was extremely increased because of melt-kneading.

Example 3

1.25 g of $C_7F_{15}COONH_4$, 2.5 g of $Na_2HPO_4.12H_2O$ and 1.5 g of $NaH_2PO_4.2H_2O$ were dissolved in 500 g of ion-exchanged water, and 100 g of $CF_2=CFOCF_2CF(CF_3)O(CF_2)_2CO_2CH_3$ and 10 g of methanol were added. Next, the monomer was emulsified into fine dispersions by using a biomixer (trade mark), ABM-4 Model produced by Nippon Seiki K. K. at 20,000 rpm for 15 minutes while cooling them so that the liquid temperature might be 20° C. or lower. The dispersion was put into a stainless steel autoclave having a capacity of one liter, which was then fully purged with nitrogen and then with tetrafluoroethylene. The temperature was elevated up to 50° C. The tetrafluoroethylene pressure was adjusted at 16.0 kg/cm². Next, a solution prepared by dissolving 1.6 g of $(NH_4)_2S_2O_8$ in 10 g of ion-exchanged water was added to the autoclave. The polymerization was conducted for one hour while tetrafluoroethylene was fed so that the tetrafluoroethylene pressure might be kept constant.

Example 4

The same polymerization process as in Example 3 was repeated except that 0.68 g of n-butyl alcohol was used instead of methanol.

Example 5

The same polymerization process as in Example 3 was repeated except that 0.38 g of n-hexyl alcohol was used instead of methanol.

Example 6

The same polymerization process as in Example 3 was repeated except that 0.5 g of n-propyl ether was used instead of methanol. The melt index and the swell of the obtained copolymer were values at 250° C., and the melt-kneading of the copolymer was conducted at 250° C.

Example 7

58 g of $C_7F_{15}COONH_4$, 116 g of $Na_2HPO_4.12H_2O$ and 69 g of $NaH_2PO_4.2H_2O$ were dissolved in 22.5 kg of ion-exchanged water, and 4.6 kg of $CF_2=CFOCF_2CF(CF_3)O(CF_2)_2CO_2CH_3$ and 580 g of methanol were added. Next, the monomer was emulsified into fine dispersions by using a biomixer (trade mark), BMO-100 Model produced by Nippon Seiki K. K., at 10,000 rpm for 20 minutes while cooling them so that the liquid temperature might be 20° C. or lower. The above operation was conducted twice. The dispersions obtained in each operation were put into a stainless steel autoclave having a capacity of 100 liters, which was then fully purged with nitrogen and then with tetrafluoroethylene. The temperature was elevated up to 50° C. The tetrafluoroethylene pressure was adjusted at 16.0 kg/cm². Next, a solution prepared by dissolving 0.15 kg of $(NH_4)_2S_2O_8$ in 1 kg of ion-exchanged water was added to the autoclave. The polymerization was conducted for one hour while tetrafluoroethylene was fed so that the tetrafluoroethylene pressure might be kept constant.

Comparative Example 5

In order to demonstrate the effect of the two conditions characterizing the method of the present invention, that is, the emulsification of monomer (1) and the addition of the water-soluble organic chain transfer agent, a copolymer having the same equivalent weight as that of the copolymer obtained in Example 2 was prepared without conducting the two conditions by a conventional method as follows.

A solution prepared by dissolving 450 g of ion-exchanged water, 1.13 g of $C_8F_{17}COONH_4$, 2.3 g of $Na_2HPO_4.12H_2O$ and 1.4 g of $NaH_2PO_4.2H_2O$, and a solution prepared by dissolving 0.2 g of n-hexane in 150 g of $CF_2=CFOCF_2CF(CF_3)O(CF_2)_2CO_2CH_3$ were put into a stainless steel autoclave having a capacity of one liter. Next, this was fully purged with nitrogen and then with tetrafluoroethylene. The temperature was elevated up to 50° C. The tetrafluoroethylene pressure was adjusted at 10.0 kg/cm². Next, a solution prepared by dissolving 0.5 g of $(NH_4)_2S_2O_8$ in 10 g of ion-exchanged water was added to the autoclave. The polymerization was conducted for one hour while tetrafluoroethylene was fed so that the tetrafluoroethylene pressure might be kept constant. After the reaction, 56.0 g of a copolymer was obtained. The film of the obtained copolymer was noticeably devitrified (to be cloudy). The copolymer was melt-kneaded at 270° C., and its swell was 265% at 270° C. The swell of the copolymer was extremely increased because of melt-kneading.

Comparative Example 6

In order to demonstrate the effect of the addition of the water-soluble organic chain transfer agent characterizing the method of the present invention, a copolymer having the same equivalent weight as that of the copolymer obtained in Example 2 was prepared without the addition as follows.

A solution prepared by dissolving 450 g of ion-exchanged water, 1.13 g of $C_8F_{17}COONH_4$, 2.3 g of $Na_2HPO_4.12H_2O$ and 1.4 g of $NaH_2PO_4.2H_2O$, and a solution prepared by dissolving 0.15 g of n-hexane in 150 g of $CF_2=CFOCF_2CF(CF_3)O(CF_2)_2CO_2CH_3$ were put into a stainless steel autoclave having a capacity of one liter. Next, the monomer was emulsified into fine dispersions by using a biomixer (trade mark), ABM-4 Model manufactured by Nippon Seiki K. K. at 20,000 rpm for 15 hours while cooling them so that the liquid temperature might be at 20° C. or lower.

Next, the dispersion was put into a stainless steel autoclave having a capacity of one liter, which was then fully purged with nitrogen and then with tetrafluoroethylene. The monomer dispersion was heated up to 50° C. The tetrafluoroethylene pressure was adjusted at 14.0 kg/cm². Subsequently, a solution prepared by dissolving 1.3 g of $(NH_4)_2S_2O_8$ in 10 g of ion-exchanged water was added to the autoclave. The polymerization was conducted for one hour while tetrafluoroethylene was fed so that the tetrafluoroethylene pressure might be kept constant. After the reaction, 48.3 g of a copolymer was obtained. The film of the obtained copolymer was devitrified a little (to be cloudy). The copolymer was melt-kneaded at 270° C., and its swell was 135% at 270° C. The swell of the copolymer was extremely increased because of melt-kneading.

Example 8

2.5 g of $C_7F_{15}COONH_4$, 2.5 g of $Na_2HPO_4.12H_2O$ and 1.5 g of $NaH_2PO_4.2H_2O$ were dissolved in 450 g of ion-exchanged water, and 100 g of $CF_2=CFOCF_2CF(CF_3)O(CF_2)_2CO_2CH_3$ and 40 g of methanol were added. Next, the monomer was emulsified into fine dispersions by using a biomixer (trade mark), ABM-4 Model manufactured by Nippon Seiki K. K. at 20,000 rpm for 15 minutes. The dispersion was put into a stainless steel autoclave having a capacity of one liter, which was then fully purged with nitrogen and then with tetrafluoroethylene. The temperature was elevated up to 40° C. The tetrafluoroethylene pressure was adjusted at 16.0 kg/cm². Next, a solution prepared by dissolving 10 g of $(NH_4)_2S_2O_8$ in 50 g of ion-exchanged water was added to the autoclave. The polymerization was conducted for one hour while tetrafluoroethylene was fed so that the tetrafluoroethylene pressure might be kept constant.

Example 9

The same process as in Example 3 was repeated except that the amount of methanol, the tetrafluoroethylene pressure and the reaction time were changed to 12.5 g, 16.5 kg/cm² and 5.5 hours respectively. The film of the obtained copolymer was devitrified a little (to be cloudy).

Example 10

The same process as in Example 9 was repeated except that the tetrafluoroethylene pressure and the reaction time were changed to 10.5 kg/cm$^2$ and 6 hours respectively.

Example 11

An aqueous solution prepared by dissolving 58 g of $C_7F_{15}COONH_4$, 116 g of $Na_2HPO_4.12H_2O$ and 69 g of $NaH_2PO_4.2H_2O$ in 22.8 kg of ion-exchanged water was put into a container (A). 4.6 kg of $CF_2=CFOCF_2CF(CF_3)O(CF_2)_2CO_2CH_3$ were put into a container (B). The monomer was emulsified into fine dispersions by using a microfluidizer (trade mark), M-110Y Model manufactured by Microfluidex Co. as follows. The both liquids were continuously fed from the container (A) and the container (B), combined and fed into the microfluidizer (trade mark) at a constant ratio by weight of 5 to 1 (as the liquid from the container (A) to the liquid from the container (B)) by using a pump capable of sending a constant amount of liquid. The stroke pressure of the microfluidizer (trade mark) was 1000 kg/cm$^2$, and the whole amount of the two liquids were fed over a period of 90 minutes while the monomer was emulsified into fine dispersions. The process was continuously conducted while the fine dispersions of the monomer was cooled so that it might be kept at 10° C. or lower at the outlet of the microfluidizer (trade mark). This operation was conducted twice, and the liquid obtained in each operation was charged into a stainless steel autoclave having a capacity of 100 liters.

Next, this was fully purged with nitrogen and then with tetrafluoroethylene. Its temperature was elevated up to 50° C. The tetrafluoroethylene pressure was adjusted at 16.8 kg/cm$^2$. Next, 1.15 kg of methanol were added to the autoclave, and a solution prepared by dissolving 0.15 kg of $(NH_4)_2S_2O_8$ in 1 kg of ion-exchanged water was added to the autoclave. The polymerization was conducted for 9.5 hours while the tetrafluoroethylene pressure was continuously reduced from 16.8 kg/cm$^2$ at the initial stage to 9.7 kg/cm$^2$ at the final stage and while 5.5 kg of tetrafluoroethylene were continuously fed into the autoclave. During the reaction, the amount of tetrafluoroethylene fed into the autoclave was continuously controlled so that the ratio of the total reduction of the tetrafluoroethylene pressure in the autoclave to the total amount of tetrafluoroethylene fed to it might be kept always constant.

Example 12

The same process as in Example 9 was repeated except that the reaction was conducted for 8 hours while the tetrafluoroethylene pressure was intermittently reduced from 16.5 kg/cm$^2$ at the initial stage to 9.5 kg/cm$^2$ at the final stage as follows.

4 g of tetrafluoroethylene was fed into the reaction tank so that the reaction pressure might be constant at 16.5 kg/cm$^2$ at the initial stage. Next, the feeding of tetrafluoroethylene was stopped and then its pressure was reduced to 16.0 kg/cm$^2$ by 0.5 kg/cm$^2$ due to the reaction. Subsequently, 4 g of tetrafluoroethylene were again fed into the reaction tank so that the reaction pressure might be constant at 16.0 kg/cm$^2$. Next, the feeding of tetrafluoroethylene was stopped and its pressure was reduced to 15.5 kg/cm$^2$ by 0.5 kg/cm$^2$ due to the reaction. This process was repeated and the pressure was reduced down to 9.5 kg/cm$^2$.

Example 13

The same process as in Example 12 was repeated except that 12.5 g of methanol, the final pressure of tetrafluoroethylene and the amount of $(NH_4)S_2O_8$ were changed to 1.0 g of methanol and 0.6 g of n-butyl alcohol, 6.5 kg/cm$^2$ and 1.8 g respectively and that a dispersion prepared by dispersing 0.5 g of n-butyl alcohol in 5 g of pure water was added when the tetrafluoroethylene pressure became 10.0 kg/cm$^2$.

Example 14

The same process as in Example 8 was repeated except that the amount of methanol and the amount of $(NH_4)S_2O_8$ were changed to 35 g and 5.4 g respectively and that the reaction was conducted for 5.5 hours while the tetrafluoroethylene pressure was intermittently reduced from 17.0 kg/cm$^2$ at the initial stage to 14.0 kg/cm$^2$ at the final stage in the same manner as in Example 12.

Use Example 1

Using the copolymers obtained in Examples 2 to 6, 8 and 12 to 14, diaphragms (cation-exchange membranes) for electrolysis of brine were prepared by the following process.

All the carboxylic functional groups of each copolymer were converted into methyl ester type groups, and the resulting copolymers were melt-kneaded at 270° C. A film having a thickness of about 200 μm was obtained from each melt-kneaded copolymer by press molding at 270° C. The film was hydrolyzed in an aqueous solution containing 30% by weight of KOH and 5% by weight of dimethylsulfoxide, at 95° C. for 2 hours, to convert it into a film having potassium salt type cation exchange groups. Further, this film having potassium salt type cation exchange groups was dipped in an aqueous solution of 0.1N sodium hydroxide at 90° C. for 1 hour to convert it into a film having sodium salt type cation exchange groups. Using this film as a diaphragm, the current efficiency in electrolysis was measured. In every case, the electrolysis was continued for 300 hours or more. The high current efficiency was obtained and the performance of the membrane used was kept stable. The results are shown in Table 3.

From the copolymers obtained in Example 9 and 10, diaphgagms were prepared in the same manner as the above. Using these, the current efficiency in electrolysis was measured, and the results are shown in Table 3. Sufficiently high current efficiency was obtained in electrolysis using the diaphragm made of the copolymer of Example 9 as the base material, but the current efficiency was not stable. In addition, the cell voltage in the cell using this membrane was extremely higher than that in the cells using any of other membranes. The cell voltage increased with the lapse of time. The performance of the membrane made of the copolymer of Example 10 as the base material were relatively stable, but the current efficiency in electrolysis using the membrane was low. Comparing the current efficiency of the membrane made of the copolymer of Example 12 as the base material and that of the membrane made of the copolymer of Example 10 having the same equivalent weight as that of the copolymer of Example 12 as the base material, with the current efficiency of the membrane made of the copolymer of Example 3 as the base material, it was verified that the properties of the copolymer obtained in low monomer conversion could be maintained by suitably reducing the tetrafluoroethylene pressure during the process of polymerization.

Diaphragms were prepared from the copolymers obtained in Comparative Examples 4 to 6 in the same manner as above. Using them, the current efficiency in electrolysis was measured, and the results are shown in Table 3. Sufficiently high current efficiency was obtained in electrolysis using the membrane made of the copolymer of Comparative Example 4 as the base material, but the current efficiency was not stable. In addition, the cell voltage in the cell using this membrane was extremely higher than that in the cells using any of Other membranes. The cell voltage increased with the lapse of time. The increase in the cell voltage was beyond the industrially acceptable range. The performance of the membranes made of the copolymers of Comparative Examples 5 and 6 as the base materials were relatively stable, but the current efficiency in electrolysis using them was low.

Use Example 2

Using the copolymer obtained in Example 7, a diaphragm (cation-exchange membrane) for electrolysis of brine was prepared by the following process.

All the carboxylic functional groups of the copolymer were converted into methyl ester type groups, and the resulting copolymer was shaped into pellets by melt-kneading extrusion at 250° C. These pellets were filmed by extrusion at 270° C. to obtain a film having a thickness of 1 mil. During the extrusion filming process, the film was not cut at the side edge, the film had no spots on the surface due to the uneven thickness and the surface of the film was not roughened. A uniform and good film was continuously obtained. Next, this film was laminated with a film having a thickness of 3.5 mils, which had been produced by extrusion filming of a copolymer of $CF_2=CFOCF_2CF(CF_3)OCF_2CF_2SO_2F$ and tetrafluoroethylene having an equivalent weight of 1025 and, at 240° C. to prepare a two-layered film of a carboxylic acid type copolymer and a sulfonic acid-type copolymer having a thickness of 4.5 mils.

This two-layered film was referred to as Film (P). Next, this Film (P) was laminated with a 18-mesh plain-weave web (Q) made of 200-denier polytetrafluoroethylene fibers, as a reinforcing material, and with a film (R) having a thickness of 1.5 mils, that had been produced by extrusion filming of a copolymer of $CF_2=CFOCF_2CF(CF_3)OCF_2CF_2SO_2F$ and tetrafluoroethylene having an equivalent weight of 1025, at 235° C. so that the layer of the perfluorocarbon copolymer containing the carboxylic functional groups in the film (P) might be faced outward, to give a multi-layered membrane (S) having a structure of film (P)/web (Q)/film (R). Next, this membrane (S) was hydrolyzed in an aqueous solution containing 30% by weight of KOH and 5% by weight of dimethylsulfoxide, at 95° C. for 2 hours, to convert it into a cation exchange membrane having potassium salt type cation exchange groups. In addition, this cation exchange membrane having potassium salt type cation exchange groups was dipped in an aqueous solution of 0.1N sodium hydroxide at 90° C. for 1 hour, to convert it into a cation exchange membrane having sodium salt type cation exchange groups. Using this cation exchange membrane as a diaphragm, the current efficiency in electrolysis was measured. Using this, the current efficiency in electrolysis to obtain an aqueous solution of sodium hydroxide having a concentration of 30.5% by weight was 96.5% to 97.5% and the cell voltage was 3.23 to 3.26 V. The performance of the membrane during the electrolysis was kept stable all the way for 500 hours.

Use Example 3

Using the copolymer obtained in Example 11, a diaphragm (cation exchange membrane) for electrolysis of brine was prepared in the same manner as in Use Example 2. During the extrusion filming of the copolymer, the film was not cut at the side edge, the film had no spots on the surface due to the uneven thickness and the surface of the film was not roughened, like in Use Example 2. A uniform and good film having a thickness of 1 mil was continuously obtained. Using the formed cation exchange membrane as a diaphragm, the current efficiency in electrolysis was measured.

Using this, the current efficiency in electrolysis to obtain an aqueous solutions of sodium hydroxide having a concentration of 30.5% by weight was 96.5% to 97.5% and the cell voltage was 3.23 to 3.26 V. The performance of the membrane during the electrolysis was kept stable all the way for 500 hours.

(Examples of the sulfonic acid type copolymer (A))

The following Examples 15 to 27 and Comparative Examples 7 to 10 demonstrate the production of the copolymers of $CF_2=CFOCF_2CF(CF_3)O(CF_2)_2SO_2F$ and tetrafluoroethylene. The results are shown in Tables 4 and 5. In Example 21 and Comparative Example 10, a hydrophobic chain transfer agent, n-hexane, was used as the molecular weight modifier for the copolymer. In Examples 18 to 20 and 22 to 27, the water-soluble organic chain transfer agent was used as the molecular weight modifier for the copolymer while maintaining a role of the transfer agent.

In all the following examples and comparative examples, the reaction temperature was 60° C. In Example 21, 23 and 24 and Comparative Example 10, a 100-liter autoclave was used. A one-liter autoclave was used in all the other examples and comparative examples.

Example 15

1.0 g of $C_7F_{15}COONH_4$, 2.5 g of $Na_2HPO_4.12H_2O$ and 1.5 g of $NaH_2PO_4.2H_2O$ were dissolved in 450 g of ion-exchanged water, and 150 g of $CF_2=CFOCF_2CF(CF_3)O(CF_2)_2SO_2F$ were added. Next, the monomer was finely emulsified into fine dispersions by using a biomixer (trade mark), ABM-4 Model produced by Nippon Seiki K. K. at 20,000 rpm for 30 minutes in total while cooling them so that the liquid temperature might be 20° C. or lower. The average diameter of the monomer droplets of the fine dispersions was 0.60 μm. The dispersion was put into a stainless steel autoclave having a capacity of one liter, which was then fully purged with nitrogen and then with tetrafluoroethylene. The temperature was elevated up to 60° C. The tetrafluoroethylene pressure was adjusted at 16.0 kg/cm². Next, a solution prepared by dissolving 1.0 g of methanol in 5 g of ion-exchanged water was added to the autoclave, and a solution prepared by dissolving 0.5 g of $(NH_4)_2S_2O_8$ in 10 g of ion-exchanged water was added to it. The polymerization was conducted for one hour while tetrafluoroethylene was fed that the tetrafluoroethylene pressure might be kept constant. After the reaction, 39.6 g of a copolymer was obtained.

The obtained copolymer had a melt index of 1.5 g/10 min at 270° C., a swell of 8%, and an equivalent weight of 1025. The copolymer was melt-kneaded at 270° C., and its swell at 270° C. was 23%. DSC of the copolymer was measured, and the heat of fusion "$H" of the crystals of the homopolymer was calculated. However, the peak was extremely small in such a degree that it could not be separated from the noise in the DSC curve, and it was lower than the detection limit ($H<0.05$ [J/g]). The conversion of the perfluorocarbon monomer containing the functional group in the reaction was 12%.

Example 16

The same process as in Example 15 was repeated except that the tetrafluoroethylene pressure was changed to 12.0 kg/cm$^2$.

Example 17

The same process as in Example 15 was repeated except that the tetrafluoroethylene pressure was changed to 9.0 kg/cm$^2$.

Example 18

The same process as in Example 15 was repeated except that the solution prepared by dissolving 1.0 g of methanol in 5 g of ion-exchanged water was changed to a solution prepared by dissolving 9.5 g of methanol in 10 g of ion-exchanged water.

Comparative Example 7

The same process as in Example 15 was repeated except that no methanol was added. The film of the obtained copolymer was devitrified a little (to be cloudy). The copolymer was melt-kneaded at 270° C., and its swell was 245% at 270° C. The swell of the copolymer was extremely increased because of melt-kneading.

Comparative Example 8

The same process as in Example 17 was repeated except that no methanol was used. The obtained copolymer was melt-kneaded at 270° C., and its swell was 143% at 270° C. The swell of the copolymer was extremely increased because of melt-kneading.

Comparative Example 9

The same process as in Example 15 was repeated except that the monomer was not emulsified into fine dispersions. The film of the obtained copolymer was noticeably devitrified (to be cloudy). The melt index of the copolymer could not be measured at 270° C. because it was smaller than 0.01 g/10 min.

Example 19

The same process as in Example 15 was repeated except that the solution prepared by dissolving 1.0 g of methanol in 5 g of ion-exchanged water was changed to a solution prepared by dissolving 0.4 g of n-butyl alcohol in 10 g of ion-exchanged water.

Example 20

The same process as in Example 15 was repeated except that the solution prepared by dissolving 1.0 g of methanol in 5 g of ion-exchanged water was changed to a dispersion prepared by dispersing 0.4 g of n-propyl ether in 10 g of ion-exchanged water. The swell and the melt index of the copolymer obtained were values at 250° C., and the melt-kneading of the copolymer was conducted at 250° C.

Example 21

42 g of $C_8F_{17}COONH_4$, 106 g of $Na_2HPO_4.12H_2O$ and 63 g of $NaH_2PO_4.2H_2O$ were dissolved in 21 kg of ion-exchanged water, and a solution prepared by dissolving 5.0 g of n-hexane in 7.0 kg of $CF_2=CFOCF_2CF(CF_3)O(CF_2)_2SO_2F$ and 50 g of methanol were added. Next, the monomer was emulsified into fine dispersions by using a biomixer (trade mark), BMO-100 Model produced by Nippon Seiki K. K. at 10,000 rpm for 60 minutes while cooling them so that the liquid temperature might be 20° C. or lower. The emulsifying operation was conducted twice. The dispersions obtained in each operation were put into a stainless steel autoclave having a capacity of 100 liters, which was then fully purged with nitrogen and then with tetrafluoroethylene. The temperature was elevated up to 60° C. The tetrafluoroethylene pressure was adjusted at 16.0 kg/cm$^2$. Next, a solution prepared by dissolving 52 g of $(NH_4)_2S_2O_8$ in 1 kg of ion-exchanged water was added to the autoclave. The polymerization was conducted for one hour while tetrafluoroethylene was fed so that the tetrafluoroethylene pressure might be kept constant.

The polymer was shaped into pellets by melt-kneading extrusion at 240° C., and the resulting pellets were filmed by extrusion at 270° C. During the extrusion filming process, the film was not cut at the side edge, the film had no spots on the surface due to the uneven thickness and the surface of the film was not roughened. Uniform, good thin films each having a thickness of 0.5 mils, 1 mil, 2 mils or 5 mils could continuously and stably be obtained.

Comparative Example 10

The same process as in Example 21 was repeated except that methanol was not added and that the tetrafluoroethylene pressure was changed to 14.5 kg/cm$^2$. In order to obtain a copolymer having the same equivalent weight as that of the copolymer of Example 21, the tetrafluoroethylene pressure was changed.

A film of the obtained polymer was devitrified a little (to be cloudy). The copolymer was melt-kneaded at 270° C., and its swell was 224% at 270° C. The swell of the copolymer was extremely increased because of melt-kneading.

The polymer was shaped into pellets by melt-kneading extrusion at 240° C., and the resulting pellets were filmed by extrusion at 270° C. in the same manner as in Example 21. During the extrusion filming process, the film was not at the side edge and a film having a thickness not larger than 10 mils could not be continuously and stably obtained. The thickness of the obtained film was not even and the film had spots on the surface due to the uneven thickness by +/−50%. In addition, the obtained film was devitrified because of the rough surface. The films could not be practically used.

Example 22

1.0 g of $C_7F_{15}COONH_4$, 2.5 g of $Na_2HPO_4.12H_2O$ and 1.5 g of $NaH_2PO_4.2H_2O$ were dissolved in 500 g of ion-exchanged water, and 100 g of $CF_2=CFOCF_2CF(CF_3)O(CF_2)_2SO_2F$ and 9.5 g of methanol were added. Next, the monomer was emulsified into fine dispersions by using a biomixer (trade mark), ABM-4 Model produced by Nippon Seiki K. K. at 20,000 rpm for 30 minutes. The dispersion was put into a stainless steel autoclave having a capacity of one liter, which was then fully purged with nitrogen and then with tetrafluoroethylene. The temperature was elevated up to 60° C. The tetrafluoroethylene pressure was adjusted at 16.5 kg/cm². Next, and a solution prepared by dissolving 2.3 g of $(NH_4)_2S_2O_8$ in 10 g of ion-exchanged water was added to the autoclave. The polymerization was conducted for 5.5 hours while tetrafluoroethylene was fed to the reaction tank so that the tetrafluoroethylene pressure might be kept constant at 16.5 kg/cm² during the reaction. The film of the obtained copolymer was devitrified a little (to be cloudy).

Example 23

An aqueous solution prepared by dissolving 42 g of $C_7F_{15}COONH_4$, 105 g of $Na_2HPO_4.12H_2O$ and 63 g of $NaH_2PO_4.2H_2O$ in 20.8 kg of ion-exchanged water was put into a container (A). 7.0 kg of $CF_2=CFOCF_2CF(CF_3)O(CF_2)_2SO_2F$ were put into a container (B). The monomer was emulsified into fine dispersions by using a microfluidizer (trade mark), M-110Y Model produced by Microfluidex Co. as follows. The both liquids were continuously fed from the container (A) and the container (B), combined and fed into the microfluidizer at a constant ratio by weight of 3/1 (as the liquid from the container (A) to the liquid from the container (B)) by using a pump capable of sending a constant amount of liquid. The stroke pressure of the microfluidizer (trade mark) was 1000 kg/cm², and the whole amount of the two liquids were fed over a period of 90 minutes while the monomer was emulsified into fine dispersions. The process was continuously conducted while the fine dispersions of the monomer was cooled so that it might be kept at 10° C. or lower at the outlet of the microfluidizer (trade mark). This operation was conducted twice, and the liquid obtained in each operation was fed into a stainless steel autoclave having a capacity of 100 liters.

Next, this was fully purged with nitrogen and then with tetrafluoroethylene. Its temperature was elevated up to 60° C. The tetrafluoroethylene pressure was adjusted at 17.2 kg/cm². Next, 735 g of methanol were added to the autoclave, and a solution prepared by dissolving 57 g of $(NH_4)_2S_2O_8$ in 1 kg of ion-exchanged water was added to it. The polymerization was conducted for 8.5 hours while the tetrafluoroethylene pressure was continuously reduced from 17.2 kg/cm² at the initial stage to 6.2 kg/cm² at the final stage and while 9.1 kg of tetrafluoroethylene were continuously fed into the autoclave. During the reaction, the amount of tetrafluoroethylene fed into the autoclave was continuously controlled so that the ratio of the total reduction in the tetrafluoroethylene pressure in the autoclave to the total amount of tetrafluoroethylene fed might be kept always constant.

The obtained copolymer was shaped into pellets by melt-kneading extrusion at 240° C., and the resulting pellets were filmed by extrusion at 270° C. During the extrusion filming process, the film was not cut at the side edge, the film had no spots on the surface due to the uneven thickness and the surface of the film was not roughened. Good thin films each having a thickness of 0.5 mils, 1 mil, 2 mils or 5 mils could be continuously and stably obtained.

Example 24

The same process as in Example 23 was repeated except that the amount of methanol, the initial tetrafluoroethylene pressure, the final tetrafluoroethylene pressure and the total tetrafluoroethylene amount fed into the reaction system from the outside were changed to 440 g, 15.0 kg/cm², 6.7 kg/cm² and 8.5 kg respectively and that the reaction was conducted for 8 hours.

The obtained copolymer was shaped into pellets by melt-kneading extrusion at 230° C., and the resulting pellets were filmed by extrusion at 245° C. During the extrusion filming process, the film was not cut at the side edge, the film had no spots on the surface due to the uneven thickness and the surface of the film was not roughened. Uniform, good thin films each having a thickness of 0.5 mils, 1 mil, 2 mils or 5 mils could be continuously and stably obtained.

Example 25

The same process as in Example 22 was repeated except that the reaction was conducted for 8 hours while the tetrafluoroethylene pressure was intermittently reduced from 16.5 kg/cm² at the initial stage to 3.5 kg/cm² at the final stage as follows.

4 g of tetrafluoroethylene was fed into the reaction tank so that the reaction pressure might be constant at 16.5 kg/cm² at the initial stage. Next, the feeding of tetrafluoroethylene was stopped and then its pressure was reduced to 16.0 kg/cm² by 0.5 kg/cm² due to the reaction. Subsequently, 4 g of tetrafluoroethylene were again fed into the reaction tank so that the reaction pressure might be constant at 16.0 kg/cm². Next, the feeding of tetrafluoroethylene was stopped and its pressure was reduced to 15.5 kg/cm² by 0.5 kg/cm² due to the reaction. This process was repeated and the pressure was reduced down to 3.5 kg/cm².

Example 26

The same process as in Example 22 was repeated except that the amount of ion-exchanged water, the amount of $CF_2=CFOCF_2CF(CF_3)O(CF_2)_2SO_2F$ and the amount of methanol was changed to 450 g, 150 g and 2.9 g respectively and that the reaction was conducted for 8 hours while the tetrafluoroethylene pressure was intermittently reduced, in the same manner as in Example 25, from 13.5 kg/cm² at the initial stage to 5.5 kg/cm² at the final stage.

Example 27

The same process as in Example 25 was repeated except that 9.5 g of methanol were changed to 1.2 g of methanol and 0.6 g of n-butyl alcohol, that a dispersion prepared by dispersing 0.5 g of n-butyl alcohol in 5 g of ion-exchanged water was added during the reaction when the tetrafluoroethylene pressure was reduced to 10.0 kg/cm² and that the reaction was conducted for 7.5 hours.

INDUSTRIAL APPLICATION

According to the production method of the present invention, a perfluorocarbon copolymer containing functional groups which has good melt moldability and excellent performance, can be produced while the formation of a homopolymer of tetrafluoroethylene in the aqueous phase is inhibited.

TABLE 1

Conditions for Copolymerization:
Reaction of Perfluorocarbon Monomer Containing Carboxylic Functional Group and Tetrafluoroethylene (TFE)

| No. | Emulsification of Monomer (1) (diameter:μm) | Water-soluble organic chain transfer agent (amount added: wt % vs. water) | Reduction | Reaction pressure of TFE gas Initial pressure (kg/cm$^2$) | Final pressure (kg/cm$^2$) | Reaction time (hour) | Yield of copolymer (g) | Convertion of monomer (1)(%) |
|---|---|---|---|---|---|---|---|---|
| Example 1 | Yes (0.55) | Methanol(0.2) | No | 15.5 | 15.5 | 1.0 | 23.2 | 9 |
| Example 2 | Yes (0.45) | Methanol(0.2) | No | 17.0 | 17.0 | 1.0 | 49.1 | 12 |
| Example 3 | Yes (0.55) | Methanol(2.0) | No | 16.0 | 16.0 | 1.0 | 31.1 | 12 |
| Example 4 | Yes (0.58) | n-Butyl Alcohol(0.14) | No | 16.0 | 16.0 | 1.0 | 23.8 | 9 |
| Example 5 | Yes (0.55) | n-Hexyl Alcohol(0.1) | No | 16.0 | 16.0 | 1.0 | 25.5 | 10 |
| Example 6 | Yes (0.54) | n-Propyl Ether(0.1) | No | 16.0 | 16.0 | 1.0 | 32.4 | 12 |
| Example 7 | Yes (0.45) | Methanol(2.6) | No | 16.0 | 16.0 | 1.0 | 2.1K | 9 |
| Example 8 | Yes (0.63) | Methanol(8.0) | No | 16.0 | 16.0 | 1.0 | 17.5 | 5 |
| Example 9 | Yes (0.58) | Methanol(2.5) | No | 16.5 | 16.5 | 5.5 | 192 | 60 |
| Example 10 | Yes (0.55) | Methanol(2.5) | No | 10.5 | 10.5 | 6.0 | 134 | 52 |
| Example 11 | Yes (0.34) | Methanol(2.5) | Yes | 16.8 | 9.7 | 9.5 | 13.6K | 57 |
| Example 12 | Yes (0.54) | Methanol(2.5) | Yes | 16.5 | 9.5 | 8.0 | 142 | 55 |
| Example 13 | Yes (0.50) | Methanol(0.2) n-Butyl Alcohol(0.1 + 0.1) | Yes | 16.5 | 6.5 | 11.0 | 194 | 75 |
| Example 14 | Yes(0.52) | Methanol(7.0) | Yes | 17.0 | 14.0 | 5.5 | 105 | 29 |
| Comparative Example 1 | No (measurement impossible) | None | No | 15.5 | 15.5 | 1.0 | 28.4 | 7 |
| Comparative Example 2 | No (measurement impossible) | Methanol(0.2) | No | 15.5 | 15.5 | 1.0 | 11.2 | 3 |
| Comparative Example 3 | Yes (0.56) | None | No | 15.5 | 15.5 | 1.0 | 37.5 | 13 |
| Comparative Example 4 | Yes (0.50) | None | No | 17.0 | 17.0 | 1.0 | 45.3 | 10 |
| Comparative Example 5 | No (measurement impossible) | None | No | 10.0 | 10.0 | 1.0 | 56.0 | 14 |
| Comparative Example 6 | Yes (0.50) | None | No | 14.0 | 14.0 | 1.0 | 48.3 | 12 |

TABLE 2

Perfluorocarbon Copolymer Containing Carboxylic Functional Groups

| Polymer | Equivalent Weight (EW)(g/eq) | Melt Index (g/10 min.) | Swell (%) | Swell after melt-kneading (%) | $H(J/g) | Content of Homopolymer (wt %) | (EW-930)/175 |
|---|---|---|---|---|---|---|---|
| Example 1 | 1090 | 0.5 | 8 | 22 | <0.05 | <0.3 | 0.91 |
| Example 2 | 1170 | 36 | 6 | 25 | 0.1 | 0.6 | 1.37 |
| Example 3 | 1090 | 13 | 7 | 22 | <0.05 | <0.3 | 0.91 |
| Example 4 | 1115 | 24 | 8 | 21 | <0.05 | <0.03 | 1.06 |
| Example 5 | 1130 | 34 | 10 | 26 | <0.05 | <0.3 | 1.14 |
| Example 6 | 1130 | 95 (250#C) | 4 | 14 | 0.1 | 0.6 | 1.14 |
| Example 7 | 1080 | 23 | 6 | 28 | <0.05 | <0.03 | 0.86 |
| Example 8 | 1460 | 13 | 12 | 22 | 0.2 | 1.3 | 3.03 |
| Example 9 | 1345 | 0.4 | 18 | 25 | 0.25 | 1.6 | 2.37 |
| Example 10 | 1090 | 12 | 14 | 24 | <0.05 | <0.3 | 0.91 |
| Example 11 | 1100 | 34 | 18 | 25 | <0.05 | <0.3 | 0.91 |
| Example 12 | 1090 | 22 | 12 | 22 | <0.05 | <0.3 | 0.97 |
| Example 13 | 1090 | 32 | 14 | 26 | <0.05 | <0.3 | 0.91 |
| Example 14 | 1530 | 8.0 | 8 | 23 | 0.3 | 1.9 | 3.42 |
| Comparative Exampe 1 | 1845 | Measurement impossible (<0.01) | Measurement impossible | Measurement impossible | 2.0 | 75. | 5.23 |
| Comparative Example 2 | 1630 | Measurement impossible (<0.01) | Measurement impossible | Measurement impossible | 10.4 | 65. | 4 |
| Comparative Example 3 | 1225 | 0.06 | 8 | 185 | 6.7 | 42. | 1.69 |
| Comparative Example 4 | 1345 | 6.4 | 8 | 235 | 8.2 | 51. | 2.37 |
| Comparative | 1170 | 24 | 6 | 265 | 9.8 | 61. | 1.37 |

TABLE 2-continued

Perfluorocarbon Copolymer Containing Carboxylic Functional Groups

| Polymer | Equivalent Weight (EW)(g/eq) | Melt Index (g/10 min.) | Swell (%) | Swell after melt-kneading (%) | $\Delta H(J/g)$ | Content of Homopolymer (wt %) | (EW-930)/175 |
|---|---|---|---|---|---|---|---|
| Example 5 Comparative Example 6 | 1170 | 18 | 6 | 135 | 5.1 | 32. | 1.37 |

TABLE 3

Current Efficiency

| Polymer | Concentration of Sodium Hydroxide (wt %) | Current Efficiency (%) |
|---|---|---|
| Example 2 | 30.5 | 96.0–97.0 |
|  | 33.0 | 96.5–97.5 |
|  | 35.0 | 97.0–98.0 |
| Example 3 | 30.5 | 96.5–97.5 |
|  | 33.0 | 96.5–97.5 |
| Example 4 | 30.5 | 96.0–97.0 |
| Example 5 | 30.5 | 95.5–96.5 |
| Example 6 | 30.5 | 95.5–96.5 |
| Example 8 | 23.0 | 96.0–97.0 |
| Example 9 | 30.5 | 94.0–96.0 |
| Example 10 | 30.5 | 93.0–94.0 |
| Example 12 | 30.5 | 96.5–97.5 |
| Example 13 | 30.5 | 96.0–97.0 |
| Example 14 | 23.0 | 96.0–97.0 |
| Comparative Example 4 | 30.5 | 93.0–96.0 |
| Comparative Example 5 | 30.5 | 90.5–91.5 |
| Comparative Example 6 | 30.5 | 93.0–94.0 |

TABLE 4

Conditions for Copolymerization:
Reaction of Perfluorocarbon Monomer containing Sulfonic Functional Group and Tetrafluoroethylene (TFE)

| No. | Emulsification of Monomer (1) (diameter:μm) | Water-soluble organic chain transfer agent (amount added: wt % vs. water) | Reduction | Initial pressure (kg/cm²) | Final pressure (kg/cm²) | Reaction time (hour) | Yield of copolymer (g) | Conversion of monomer (1)(%) |
|---|---|---|---|---|---|---|---|---|
| Example 15 | Yes(0.60) | Methanol(0.2) | No | 16.0 | 16.0 | 1.0 | 39.6 | 12 |
| Example 16 | Yes(0.56) | Methanol(0.2) | No | 12.0 | 12.0 | 1.0 | 27.8 | 9 |
| Example 17 | Yes(0.65) | Methanol(0.2) | No | 9.0 | 9.0 | 1.0 | 26.2 | 10 |
| Example 18 | Yes(0.58) | Methanol(2.1) | No | 16.0 | 16.0 | 1.0 | 32.4 | 10 |
| Example 19 | Yes(0.62) | n-Butyl Alcohol(0.1) | No | 16.0 | 16.0 | 1.0 | 35.4 | 10 |
| Example 20 | Yes(0.65) | n-Propyl Ether(0.1) | No | 16.0 | 16.0 | 1.0 | 33.4 | 10 |
| Example 21 | Yes(0.60) | Methanol(0.24) | No | 16.0 | 16.0 | 1.0 | 3.1K | 10 |
| Example 22 | Yes(0.56) | Methanol(1.9) | No | 16.5 | 16.5 | 5.5 | 236 | 74 |
| Example 23 | Yes(0.39) | Methanol(1.8) | Yes | 17.2 | 6.2 | 8.5 | 24.3K | 76 |
| Example 24 | Yes(0.32) | Methanol(1.1) | Yes | 15.0 | 6.7 | 8.0 | 22.5K | 74 |
| Example 25 | Yes(0.59) | Methanol(1.90 | Yes | 16.5 | 3.5 | 8.0 | 203. | 88 |
| Example 26 | Yes(0.56) | Methnaol(0.64) | Yes | 13.5 | 5.5 | 8.0 | 208. | 71 |
| Example 27 | Yes(0.64) | Methanol(0.24) n-Butyl Alcohol(0.1 + 0.1) | Yes | 16.5 | 3.5 | 7.5 | 210. | 92 |
| Comparative Example 7 | Yes(0.57) | None | No | 16.0 | 16.0 | 1.0 | 43.7 | 12 |
| Comparative Example 8 | Yes(0.64) | None | No | 9.0 | 9.0 | 1.0 | 31.4 | 12 |
| Comparative Example 9 | No (measurement impossible) | Methanol(0.2) | No | 16.0 | 16.0 | 1.0 | 20.5 | 3 |
| Comparative Example 10 | Yes(0.65) | None | No | 14.5 | 14.5 | 1.0 | 2.9K | 9 |

TABLE 5

| Polymer | Equivalent Weight (EW)(g/eq) | Melt Index (g/10 min.) | Swell (%) | Swell after melt-kneading (%) | $H(J/g) | Content of Homopolymer (wt %) | (EW-930)/175 |
|---|---|---|---|---|---|---|---|
| | | | Perfluorocarbon Copolymer containing Sulfonic Functional Groups | | | | |
| Example 15 | 1025 | 1.5 | 8 | 23 | <0.05 | <0.3 | 0.54 |
| Example 16 | 920 | 8.4 | 9 | 14 | <0.05 | <0.3 | — |
| Example 17 | 780 | 55 | 6 | 12 | <0.05 | <0.3 | — |
| Example 18 | 1015 | 18 | 5 | 22 | <0.05 | <0.3 | 0.49 |
| Example 19 | 1025 | 12 | 8 | 24 | <0.05 | <0.3 | 0.54 |
| Example 20 | 1030 | 25(250#C) | 8 | 26 | <0.05 | <0.3 | 0.57 |
| Example 21 | 1030 | 26 | 9 | 27 | <0.05 | <0.3 | 0.57 |
| Example 22 | 1420 | 0.08 | 8 | 22 | 0.25 | 1.6 | 2.8 |
| Example 23 | 1020 | 20 | 4 | 14 | <0.05 | <0.3 | 0.51 |
| Example 24 | 970 | 18 | 5 | 11 | <0.05 | <0.3 | — |
| Example 25 | 1030 | 42 | 6 | 10 | <0.05 | <0.3 | 0.57 |
| Example 26 | 870 | 21 | 5 | 12 | <0.05 | <0.3 | — |
| Example 27 | 1020 | 20 | 7 | 22 | 0.5 | <0.3 | 0.51 |
| Comparative Example 7 | 1075 | 0.24 | 8 | 245 | 0.3 | 3.1 | 0.83 |
| Comparative Example 8 | 815 | 28 | 7 | 143 | 9.5 | 1.9 | — |
| Comparative Example 9 | 1950 | Measurement impossible (<0.01) | Measurement impossible | Measurement impossible | 59. | 5.83 | |
| Comparative Example 10 | 1030 | 15 | 6 | 224 | 3.5 | 22. | 0.57 |

We claim:

1. A method for producing a perfluorocarbon copolymer containing functional groups, which comprises:

emulsifying a perfluorocarbon monomer containing a functional group represented by the following general formula (1) into fine dispersions having an average diameter of 2 μm or less in water:

$$CF_2=CF-O-(CF_2CF(CF_3)-O)n-(CF_2)m-Z \quad (1)$$

wherein m is an integer of 2 to 4; Z is $CO_2R$ (where R represents an alkyl group having 1 to 3 carbon atoms) or $SO_2F$; n is 1 or 2 when Z is $CO_2R$ and n is an integer of 0 to 2 when Z is $SO_2F$, adding at least one water-soluble organic chain transfer agent selected from the group consisting of aliphatic alcohols having 1 to 6 carbon atoms and ethers having 2 to 6 carbon atoms and polymerizing the perfluorocarbon monomer (1) containing a functional group with tetrafluoroethylene represented by the following formula (2):

$$CF_2=CF_2 \quad (2).$$

2. The method for producing a perfluorocarbon copolymer containing functional groups according to claim 1, further comprising:

reducing the reaction pressure of tetrafluoroethylene in accordance with the increase in a conversion of the monomer (1) containing a functional group to prevent an equivalent weight of the produced perfluorocarbon copolymer containing functional groups from changing.

3. The method for producing a perfluorocarbon copolymer containing functional groups according to claim 1 or 2, wherein the perfluorocarbon monomer (1) containing a functional group is emulsified into fine dispersions having an average diameter of 1 μm or less in water.

4. The method for producing a perfluorocarbon copolymer containing functional groups according to claim 1 or 2, wherein the water-soluble organic chain transfer agent is an aliphatic alcohol having 1 to 6 carbon atoms.

5. The method for a producing perfluorocarbon copolymer containing functional groups according to claim 1 or 2, wherein the water-soluble organic chain transfer agent is methanol.

6. The method for producing a perfluorocarbon copolymer containing functional groups according to claim 1 or 2, wherein the water-soluble organic chain transfer agent is a combination of an aliphatic alcohol having 2 to 6 carbon atoms and methanol.

7. The method for a producing perfluorocarbon copolymer containing functional groups according to claim 1 or 2, wherein the perfluorocarbon monomer (1) containing a functional group is $CF_2=CF-O-CF_2CF(CF_3)-O-(CF_2)_2-CO_2CH_3$.

8. The method for producing a perfluorocarbon copolymer containing functional groups according to claim 1 or 2, wherein the perfluorocarbon monomer (1) containing a functional group is $CF_2=CF-O-CF_2CF(CF_3)-O-(CF_2)_2-SO_2F$.

9. A method, which comprises:

emulsifying an aqueous composition that contains a perfluorocarbon monomer, having a functional group, of formula (1) to obtain a fine dispersion of said perfluorocarbon monomer having an average particle size of 2 μm or less:

$$CF_2=CF-O-(CF_2CF_2(CF_3)-O)_n-(CF_2)_m-Z$$

wherein m is an integer of 2 to 4; Z is $SO_2F$ or $CO_2R$, wherein R is an alkyl group having 1 to 3 carbon atoms; n is 1 or 2 when Z is $CO_2R$ and n is an integer of 0 to 2 when Z is $SO_2F$; and copolymerizing said emulsified perfluorocarbon monomer with gaseous tetrafluoroethylene in the presence of a water-soluble organic; chain transfer agent selected from the group consisting of aliphatic alcohols having 1 to 6 carbon atoms and ethers having 2 to 6 carbon atoms, under pressure of from 1 to 200 kg/cm$^2$ at a temperature in the range of 20° C. to 90° C. to thereby produce a perfluorocarbon copolymer containing functional groups.

10. The method according to claim 9, wherein said water-soluble organic chain transfer agent is added to said emulsified perfluorocarbon monomer containing composition prior to said copolymerization.

11. The method according to claim 9, wherein said water-soluble organic chain transfer agent is contained in an amount of from 0.01 to 20% by weight based on the amount of water.

12. The method according to claim 10, wherein said aqueous composition further comprises a dispersing agent selected from the group consisting of potassium, sodium, or ammonium perfluorosulfonates and potassium, sodium, or ammonium perfluorocarboxylates.

* * * * *